Aug. 20, 1940. J. A. WALLER 2,212,057
GARDEN IMPLEMENT
Filed April 8, 1939
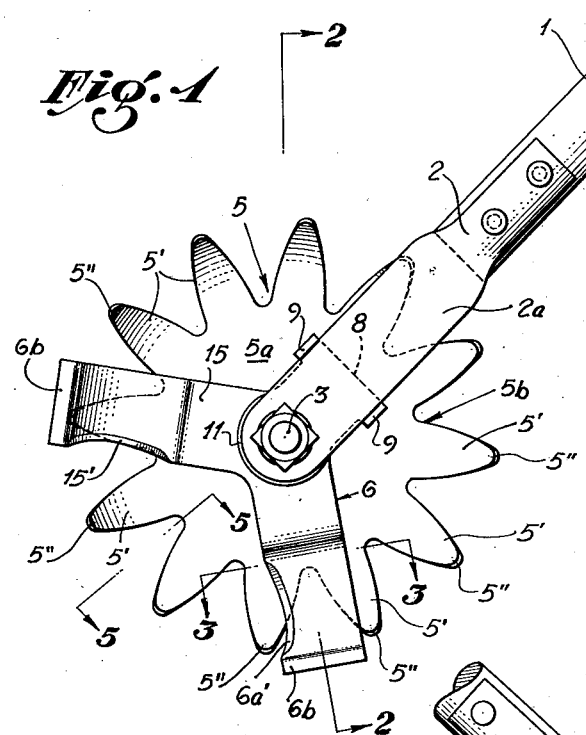
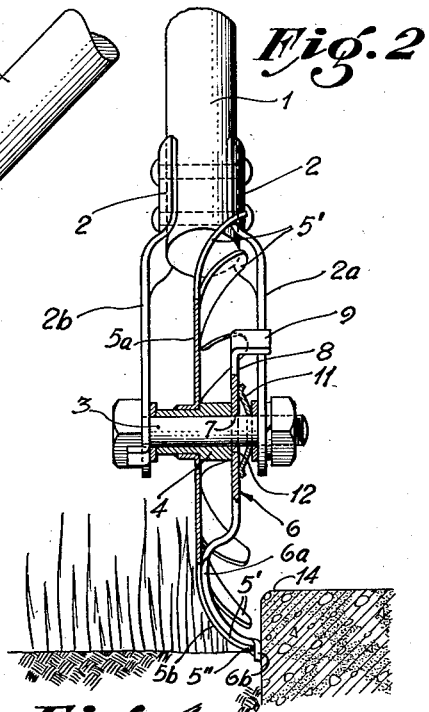
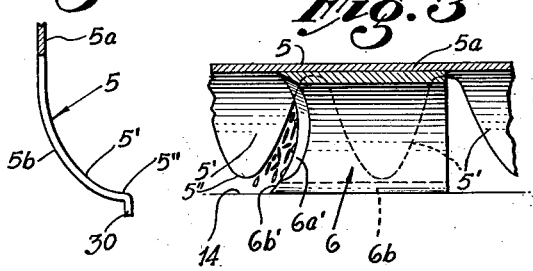
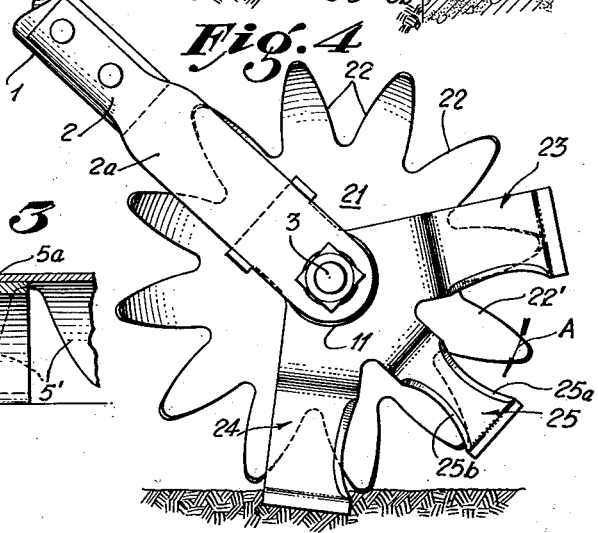
JOHN A. WALLER
INVENTOR
BY *Arthur P. Knight and Alfred W. Knight*
ATTORNEYS.

Patented Aug. 20, 1940

2,212,057

UNITED STATES PATENT OFFICE 2,212,057

GARDEN IMPLEMENT

John A. Waller, Beverly Hills, Calif., assignor of one-half to Charles E. Mockbee, Los Angeles, Calif.

Application April 8, 1939, Serial No. 266,778

9 Claims. (Cl. 56—256)

This invention relates to a garden implement and pertains particularly to a tool for "edging" lawns, i. e., to a tool adapted for propulsion along the edge of a lawn to produce a clean-cut appearance.

A particular object of the invention is to provide an edging tool which may be propelled along a lawn edge in the cutting or "edging" operation with a minimum expenditure of effort on the part of the user, which is of inexpensive construction, and which will maintain its cutting elements in operating condition over a long period of use.

A further object of the invention is to provide a lawn edging tool provided with cooperating rotatable and fixed cutting members, in which the rotatable cutting member serves as a supporting element, riding along the surface which is operated upon after the fashion of a roller or drum.

A further object of the invention is to provide a lawn edging tool which is adapted to work close to a sidewalk, curb, or the like, and to pull the grass away from the sidewalk or curb edge into engagement between the fixed and rotatable cutter elements. A further object of the invention is to provide a device which is adapted for use around the base of small trees, shrubs, and the like, where no distinct abutment such as a curb or the like is available.

A further object of the invention is to provide a lawn edging tool having a plurality of cooperating cutter elements including a rotatable cutting element provided with a plurality of circumferentially arranged cutting teeth and a fixed cutting element including two spaced cutting blades arranged in cooperative relation with respect to the rotatable cutting element and adapted for separate functions, i. e., the one fixed cutting blade being adapted to trim the projecting ends of the glass blades adjacent the line along which the edging tool is propelled and the other fixed cutting blade being adapted to draw other grass blades inwardly of the device along said line so as to accentuate the "edging" effect of the implement.

The device of the present invention comprises, essentially, a handle member carrying a fixed blade and a dish-shaped rotatable blade conforming to a surface of revolution provided with a concave rim portion comprised of a plurality of peripherally disposed cutting teeth which are curved toward the fixed blade, the outer tip portions of the respective cutting blades on the rotatable cutting element being so disposed that the surfaces thereof approach parallelism with the axis of rotation of the rotatable cutter element and serve as a drum or roller to support the device upon the turf or lawn over which the device is propelled in use. The fixed cutting blade element is preferably provided with an abutment element spaced from the outer tip portions of the blades of the rotatable cutter element in an axial direction and adapted to ride in engagement with the curb or sidewalk along which the implement is propelled to protect such tip portions from engagement with such curb, sidewalk or other object, and to force upstanding grass stems and the like away from said curb or sidewalk into engagement with the rotatable cutting blades. The device preferably also includes an additional fixed cutting member spaced from the first-mentioned fixed cutting member so as to engage the respective blades of the rotatable cutting element in advance of engagement thereof by the first-mentioned fixed cutting blade. The device is adapted to be held in a substantially vertical plane which includes the line of movement of the device in an "edging" operation, with the handle member disposed at a convenient rearwardly sloping angle of about 45°.

Other features and advantages of the invention will be brought out in the ensuing description of illustrative embodiments, or will be apparent from such description. The accompanying drawing illustrates such embodiments, and referring thereto:

Fig. 1 is a side elevation of the device in an attitude representing propulsion of the device in a left-hand direction.

Fig. 2 is a partly sectional view thereof taken on line 2—2 in Fig. 1, showing the attitude of the device as propelled in a direction away from the plane of the drawing;

Fig. 3 illustrates the cooperative action of the fixed and rotatable cutter members in drawing the grass blades away from the curb or sidewalk line into engagement between the respective cutting members, this view being taken generally along line 3—3 in Fig. 1;

Fig. 4 is a view corresponding to Fig. 1, showing a slightly modified form of device and serving to illustrate the attitude adopted by the device when propelled in a right-hand direction; and Fig. 5 is an enlarged detail broken-away view of one of the blade members of the rotatable cutting element of the construction, taken along a line corresponding to that shown at 5—5 in Fig. 1, illustrating a further modification of the device.

Referring to Figs. 1, 2, and 3 of the drawing, the device may comprise a handle member 1 carrying a fork 2 formed as two separate tines 2a and 2b, the outer end of which carry an axle member 3 preferably extending substantially transverse to the length of the handle member 1 and supporting a hub portion 4 of a rotatable cutting element 5 and a fixed cutting element 6. The rotatable cutting element 5 preferably comprises a flat plate central portion 5a and a concave rim portion 5b, the latter being comprised by a plurality of circumferentially spaced outwardly extending blade members 5' which curve toward parallelism with the axis of symmetry of the element 5, as established by the axle 3. The fixed cutting element 6 is conveniently mounted on the axle 3 as by providing an opening 7 in said blade 6 adapted to pass over the axle 3 and a rearwardly projecting locking portion 8 provided with ears or tabs 9 engaging the edge portions of the adjacent tine 2a. The fixed blade 6 may conveniently be forced toward and maintained in engagement with the rotatable cutting element 5 through the agency of a spring washer 11, if desired, and in this connection the hub portion 4 is preferably projected axially to one side of the plane of the element 5 so as to provide a bearing surface of reduced area, as at 12, against which the blade 6 may abut in use, the cutting edge portion 6a of the blade 6 being bent inwardly and then outwardly at its outer end to follow the contour of the curve of the individual blade members 5' of the rotatable cutting element 5.

As above set forth, the blades 5' are bent outwardly from the plane of the element 5 so as to give a dished shape to said cutting element, and the tip portions 5" of the blades are preferably so curved that the surfaces thereof approach parallelism with the axis of rotation of the rotatable blade element, although good operating characteristics are obtained when the inclination of the tip portions 5" is as much as 45° to the axis of rotation. The function of the dish-shape of the rotatable cutter element is that of providing a drum-like roller which may be moved over the turf after the fashion of a continuous wheel, the outer surface of the concave rim portion of the implement engaging the ground to support the implement, which provides a novel method of operation distinct from the method of operation provided by the hitherto proposed forms of edging implements which have relied upon an auxiliary roller or ground-engaging element to effect the desired rotation of the rotatable portion of the cutter assembly.

In use, the blades 5' have no significant component of motion in the direction of travel of the device along the turf surface at the position of the cutting portion 6a of the fixed cutting blade 6, the respective cutting blades 5' being substantially immobile with respect to the grass blades operated upon, and the forward movement of the fixed cutting blade into engagement with the grass blades serves to crowd the grass blades inwardly of the device after the manner illustrated in Fig. 3 due to the rearward sweep which is provided as at 6a' at the forward edge of the cutting blade. The rotative movement of the element 5 causes the blades 5' to move downwardly into cutting position with respect to the grass blades, "parting" the grass blades much as would a comb and gathering the grass blades to be cut between the adjacent blades 5'.

In order to protect the tip portions 5" of the blades 5' from undue wear by engagement with a curb or sidewalk along which the device is propelled, and to further the aforesaid inward crowding of grass blades, I preferably so form the tip portion of the fixed blade 6 to provide an axially extending portion or overhanging guard flange 6b, said flange portion being adapted to abut or engage the curb or sidewalk 14 and serve as a protecting abutment element as illustrated particularly in Fig. 2, and this portion of the device is preferably also tapered rearwardly as at 6b' in substantial conformity with the rearward sweep 6a' of the forward edge of the blade 6.

The fixed cutting blade 6 is preferably disposed at such an angle with respect to the length of the handle 1 as to be disposed nearly vertical when the handle 1 is held in a normal operating attitude of about 45°, more preferably, the angle of the blade 6 with respect to the handle 1 being such as to dispose the cutting edge 6a' of the cutting blade substantially vertically downward from the axis of rotation as defined by the axle 3.

The above description, referring to a single fixed cutting blade 6, pertains to the construction of a device adapted for movement along a turf line against a curb or sidewalk line disposed to the left of the operator. As shown in Fig. 1, I preferably also provide a second fixed cutting blade 15 corresponding to the blade 6 but making an opposite angle with respect to the handle 1 and having a cutting edge portion 15' directed oppositely to that of the blade 6, which will be employed when the device is moved along a lawn edge against a curb or sidewalk line disposed to the right of the operator, as may be visualized by rotating the drawing 90° in a counterclockwise direction and considering the movement of the device would be in the right-hand direction. This direction of movement is also illustrated in Fig. 4.

The form of device illustrated in Fig. 4 comprises a rotatable cutter element 21 corresponding to the element 5 above and provided with peripherally disposed cutting blades 22 corresponding to the blades 5' above, together with fixed cutting blades 23 and 24 corresponding to the blades 6 and 15 above. In this particular embodiment of the invention I have illustrated the provision of an auxiliary cutting blade 25 which may have substantially the same shape in cross-section as that illustrated in Fig. 2 in connection with the blade 6 and positioned intermediate the blades 23 and 24, i. e., in such position as to be circumferentially spaced forwardly of the respective blades 23 and 24 with respect to the direction of movement of the implement in use. The blade 25 is conveniently provided with oppositely directed cutting edge portions 25a and 25b for cooperation with the rotatable blades 22 in each direction of propulsion of the implement.

When a device of the type shown in Fig. 4 is employed, the fixed blade 25 will serve to trim the projecting ends of grass blades by a descending rotatable blade 22' (which is moving in the direction indicated by the arrow A) at a point above the level at which the blade 24 acts upon the grass blades and will thus serve to cut back the contour of the turf along the line of propulsion of the implement. Due to the fact that the movement of the respective blades 22 relative to the grass blades is substantially wholly downward, as results from the propulsion of the rotatable cutting element by engagement with the turf surface at the tip portions of the blades, as described in connection with Figs. 1 to 3, the stubble remaining after the tips have been cut off between the blade 25 and one of the blades 22 will for the most part slide along the rearward surface of the rotatable element 21 and will not again be cut by engagement between the blades 22 and either of the blades 24 or 25, and the function of the cooperating blades 22 and fixed blade 24 will be mainly that of trimming the grass blades away from the curb or sidewalk line, after the fashion, illustrated in Fig. 3. This action does not result where a separate ground wheel or roller is employed to drive the cutting blades to impart relative movement between the cutting blades and the grass at the position of cutting, as has been the practice in the prior art.

The device of the present invention is obviously subject to modification, within the scope of the appended claims, as will be apparent to one skilled in the art; for example, the central portion of the rotatable cutting element is shown as a plane, but it will be appreciated that this central portion may be made of conical configuration without departing from the spirit of the invention. Similarly, I may provide the tip portions 5'' of the blades 5' with a radially extending projection, as shown at 30 in Fig. 5, which projections will be adapted to engage the ground or turf more firmly and thus insure proper rotation of the rotatable blade assembly during operation of the device. In the appended claims the word "ground" is employed to designate broadly the surface over which the implement is moved in use, and it will be appreciated that this expression is intended to contemplate any such surface, such as may be offered by a lawn, turf, or the like.

I claim:

1. A lawn-edging implement of the character described, which comprises: a handle member; a dish-shaped rotary cutter element rotatably mounted on said handle member, said cutter element comprising a substantially plane center section disposed normal to the axis of rotation thereof and a peripheral rim portion curved away from the plane of said center section at one axial side thereof toward parallelism with said axis and conforming to a surface of revolution about said axis, said rim portion being comprised of a plurality of outwardly extending circumferentially spaced blade members; and a stationary cutter carried by said handle member and having a cutting edge disposed at the inward contour of said peripheral rim portion of said rotary cutter element and adapted for sliding engagement therewith at all rotative positions of said cutter element in shearing cooperation with said blade members upon rotation of said rotary cutter element.

2. A lawn-edging implement of the character described, which comprises: an elongated handle member; a dish-shaped rotary cutter conforming to a surface of revolution and mounted for rotation about its axis of symmetry on said handle member at one end thereof, said cutter having a concave rim portion whose outer surface engages the ground to support the implement in use, said rim portion being made up of a plurality of outwardly projecting circumferentially spaced blade members curved toward parallelism with said axis; and a stationary cutter secured to said handle member and having a cutting edge disposed at the inner surface of said concave rim portion in sliding engagement therewith in shearing cooperation with said blade members upon rotation of said rotary cutter, said stationary cutter being located at such angle with respect to said handle member as to assume a substantially vertical depending position when said implement is moved along the ground in use, and said stationary cutter being provided with a projecting end portion extending beyond the outer tip portions of said blade members in an axial direction in position to serve as a protecting abutment element adapted to preserve said tip portions from engagement with objects located at the adjacent axial side of said implement.

3. The lawn-edging implement set forth in claim 2, the cutting edge of said stationary cutter being inclined inwardly of said implement and rearwardly with respect to the direction which said implement is moved along the ground in use, whereby grass blades engaged by said stationary cutter at the outermost portions thereof are moved inwardly toward the position of the blade members during use of the implement.

4. A lawn-edging implement of the character described, which comprises: an elongated handle member provided at one end with a fork member having two spaced tines; an axle member secured to said tines and extending substantially transverse to the length of said handle member; a dish-shaped rotary cutter conforming to a surface of revolution and mounted for rotation about its axis of symmetry on said axle member between said two spaced tines, said cutter having a concave rim portion whose outer surface engages the ground to support the implement in use, said rim portion being made up of a plurality of outwardly projecting circumferentially spaced blade members curved toward parallelism with said axis; and a stationary cutter mounted on the one of said tines which is disposed at the concave side of said dish-shaped rotary cutter, said stationary cutter having a cutting edge disposed at the inner surface of said concave rim portion in sliding engagement therewith in shearing cooperation with said blade members upon rotation of said rotary cutter.

5. The lawn-edging implement set forth in claim 4, said stationary cutter being adapted to assume a depending substantially vertical position when said implement is moved along the ground in use, and provided with a projecting end portion extending beyond the outer tip portions of said blade members in an axial direction in position to serve as a protecting abutment element adapted to preserve said tip portions from engagement with objects located at the adjacent axial side of said implement.

6. The lawn-edging implement set forth in claim 4, said stationary cutter being adapted to assume a depending substantially vertical position when said implement is moved along the ground in use, and provided with a projecting end portion extending beyond the outer tip portions of said blade members in an axial direction in position to serve as a protecting abutment element adapted to preserve said tip portions from engagement with objects located at the adjacent axial side of said implement, and the cutting edge of said stationary cutter being inclined inwardly of said implement and rearwardly with respect to the direction which said implement is moved along the ground in use, whereby grass blades engaged by said stationary cutter at the outermost portions thereof are moved inwardly toward the position of the blade members during use of the implement.

7. A lawn-edging implement of the character described, which comprises: an elongated handle member; a dish-shaped rotary cutter conforming to a surface of revolution and mounted for rotation about its axis of symmetry on said handle member at one end thereof, said cutter having a concave rim portion whose outer surface engages the ground to support the implement in use, said rim portion being made up of a plurality of outwardly projecting circumferentially spaced blade members curved toward parallelism with said axis; a stationary cutter secured to said handle member and having a cutting edge disposed at the inner surface of said concave rim portion in sliding engagement therewith in shearing cooperation with said blade members upon rotation of said rotary cutter, said stationary cutter being located at such angle with respect to said handle member as to assume a substantially vertical depending position when said implement is moved along the ground in use; and a second stationary cutter secured to said handle member and having a cutting edge disposed at the inner surface of said concave rim portion in shearing cooperation with said blade members, said second cutter being disposed at a position circumferentially spaced from said first-named cutter and forwardly thereof in the direction of movement of the implement in use.

8. A lawn-edging implement of the character described, which comprises: an elongated handle member provided at one end with a fork member having two spaced tines; an axle member secured to said tines and extending substantially transversely to the length of the handle member; a dish-shaped rotary cutter conforming to a surface of revolution and mounted for rotation about its axis of symmetry on said axle member between said two spaced tines, said cutter having a concave rim portion whose outer surface engages the ground to support the implement in use, said rim portion being made up of a plurality of outwardly projecting circumferentially spaced blade members curved toward parallelism with said axis; and stationary cutter means mounted on the one of said tines which is disposed at the concave side of said dish-shaped rotary cutter, said stationary cutter means comprising two circumferentially spaced fixed cutting blades having respective cutting edges each disposed at the inner surface of said concave rim portion in sliding engagement therewith in shearing cooperation with said blade members upon rotation of said rotary cutter, one of said cutting blades being positioned to assume a substantially vertical position when said implement is moved along the ground in use and the other of said stationary cutting blades being spaced forwardly of said one cutting blade in the direction of movement of the implement.

9. The lawn-edging implement set forth in claim 8, the cutting edge of said one stationary cutting blade being inclined inwardly of said implement and rearwardly with respect to the direction in which said implement is moved along the ground in use, whereby grass blades engaged by said one stationary cutting blade at the outermost portions thereof are moved inwardly toward the position of the rotary blade members during use of the implement.

JOHN A. WALLER.